United States Patent
Matsu et al.

(10) Patent No.: US 8,616,577 B1
(45) Date of Patent: Dec. 31, 2013

(54) STEERING WHEEL VIBRATION DAMPING SYSTEM

(71) Applicant: Autoliv ASP, Inc., Ogden, UT (US)

(72) Inventors: Richard Lawrence Matsu, Plymouth, MI (US); David R. Palm, Davisburg, MI (US); Jan Pontus Soderstrom, Rochester, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/655,726

(22) Filed: Oct. 19, 2012

(51) Int. Cl.
*B60R 21/203* (2006.01)

(52) U.S. Cl.
USPC ........................................ 280/728.2; 280/731

(58) Field of Classification Search
CPC ............................ B60R 21/203; B60R 21/2037
USPC ............................................... 280/728.2, 731
See application file for complete search history.

(56) References Cited

U.S. PATENT DOCUMENTS

| | | | | |
|---|---|---|---|---|
| 4,785,144 A | * | 11/1988 | Fosnaugh et al. | 200/61.55 |
| 5,410,114 A | * | 4/1995 | Furuie et al. | 200/61.55 |
| 5,931,492 A | * | 8/1999 | Mueller et al. | 280/728.2 |
| 7,708,309 B2 | | 5/2010 | Kim et al. | |
| 8,087,691 B2 | | 1/2012 | Nebel et al. | |
| 2009/0218739 A1 | * | 9/2009 | Terada et al. | 267/2 |
| 2011/0089672 A1 | * | 4/2011 | Nebel et al. | 280/728.2 |
| 2011/0204602 A1 | * | 8/2011 | James et al. | 280/728.2 |

FOREIGN PATENT DOCUMENTS

| | | |
|---|---|---|
| EP | 2 085 290 A1 | 8/2009 |
| EP | 2 300 275 B1 | 1/2012 |
| WO | WO2012/032860 | 3/2012 |

* cited by examiner

*Primary Examiner* — Joseph Rocca
(74) *Attorney, Agent, or Firm* — Brinks Gilson & Lione

(57) ABSTRACT

A steering wheel unit includes a steering wheel body and an airbag module mounted thereto. The airbag module includes positioning means for maintaining the axial positioning of the airbag module relative to the steering wheel and positioning means for maintaining the radial positioning of the airbag module relative to the steering wheel. The steering wheel unit also includes damping elements that are disposed between the insertion elements and receiving elements of the radial positioning means. The radial positioning means can be in the form of a post within a cylindrical receptacle, where the damping element is therebetween. The radial positioning means can be in the form of a plate received within a u-shaped receiving element, where the damping element is within the u-shaped receiving element.

20 Claims, 10 Drawing Sheets

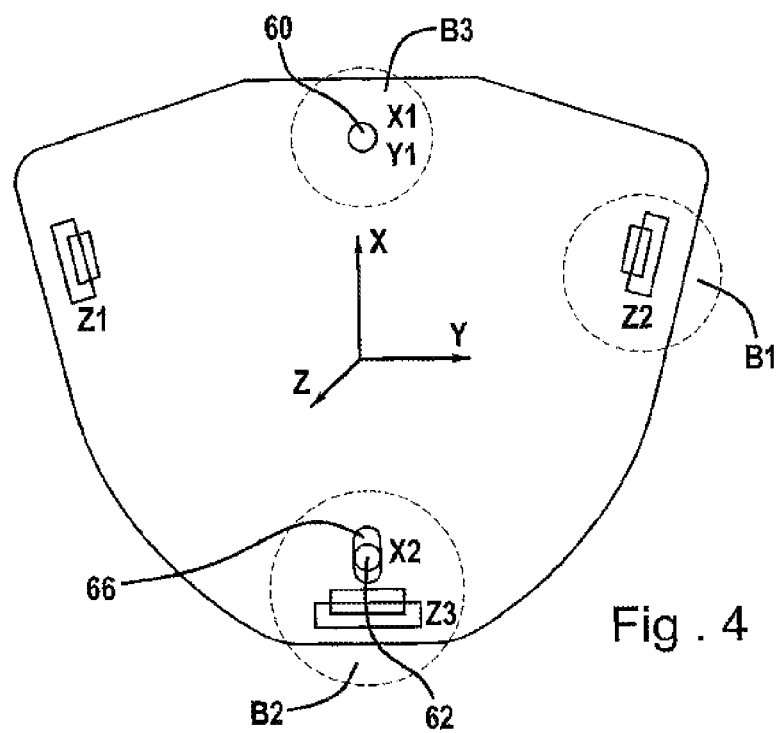
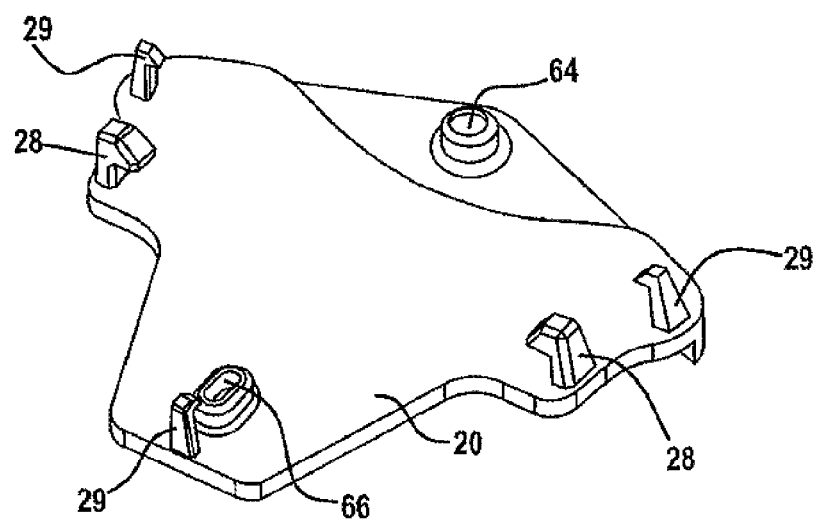
Fig. 4
Fig. 5

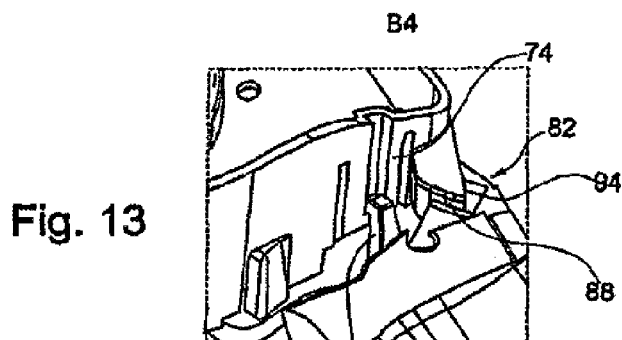
Fig. 13
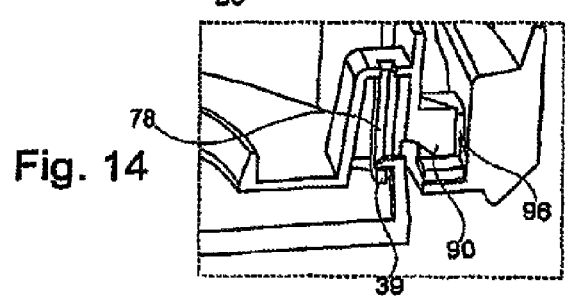
Fig. 14
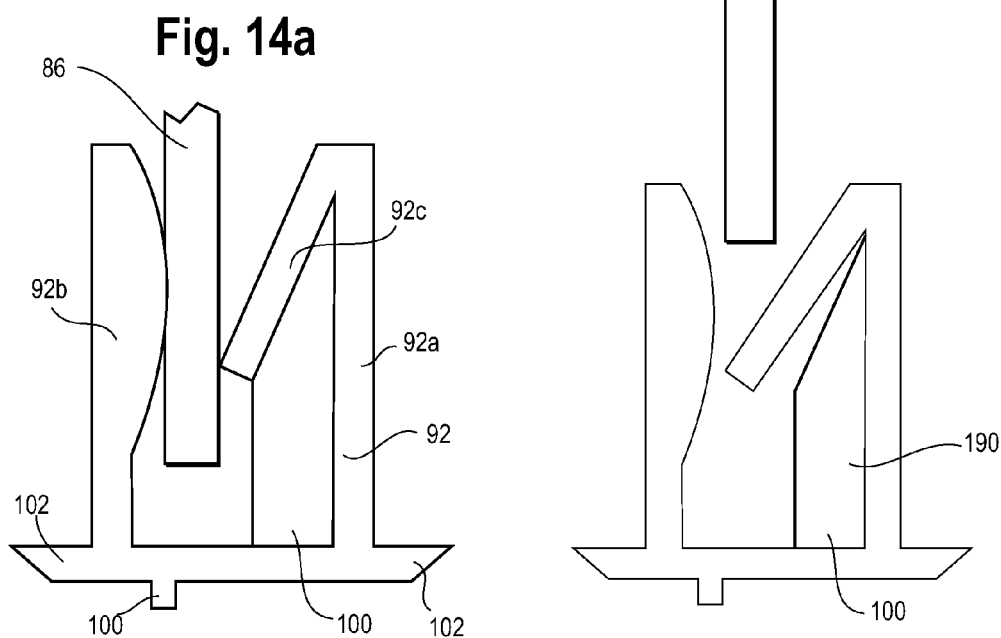
Fig. 14a
Fig. 14b

STEERING WHEEL VIBRATION DAMPING SYSTEM

BACKGROUND

1. Field of the Invention

The present invention generally relates to a steering wheel unit for a motor vehicle having an airbag module incorporated into the steering wheel.

2. Description of the Related Art

Motor vehicle steering wheels allow the vehicle operator to control the steering of the vehicle, as is well known in the art. While driving, the steering wheel can often experience vibrations which are passed on to the operator. The vibrations can be the result of imbalance in the tires or wheels, wheels mounted off-center, roughness or unevenness of the road or other driving surface, roughness of the braking mechanism, etc. The vibrations can also lead to a "bump-squeak-rattle" effect due to the various components mounted to the steering wheel. Vibrations and "bump-squeak-rattle" in the steering wheel can affect the comfort of the operator while driving.

One type of component mounted to the steering wheel is a vehicle airbag module. The airbag module can be mounted to the steering wheel in a manner to allow for the airbag module to be depressed for actuating the vehicle horn.

The airbag module, being mounted to the steering wheel, undergoes vibrations that are present in the steering wheel. These vibrations between the steering wheel and the airbag module can lead to the undesirable "bump-squeak-rattle" effect. Thus, there is need to provide vibration damping to both the steering wheel and airbag module to reduce vibrations and reduce instances of "bump-squeak-rattle."

SUMMARY

The present invention relates to the construction of a steering wheel unit for a motor vehicle with a steering wheel, the steering wheel unit including: a steering wheel body having a hub area; an airbag module mounted to the hub area, the airbag module having a housing, an airbag folded into the housing, and a gas generator, wherein the airbag module can be pushed down against the force of at least one spring element to activate a horn. The steering wheel unit further includes axial positioning means for retaining the airbag module at least axially relative to the steering wheel body, and at least one radial positioning means for retaining the radial positioning of the airbag module relative to the steering wheel body, where the radial positioning means includes an insertion element and a receiving element. One of the insertion element or the receiving element is connected to one of the airbag module or the steering wheel body, and the other of the insertion element of the receiving element is mounted to the other of the airbag module or the steering wheel body. The steering wheel unit also includes a vibration damping element mounted between at least a portion of the insertion element and at least a portion of the receiving element for limiting the vibration.

In another form, the receiving element and the insertion element are axially moveable relative to each other.

In yet another form, the steering wheel body includes a mounting plate having the hub area, the airbag module is mounted to the mounting plate, and the mounting plate is fixedly mounted to the steering wheel body.

In still another form, the insertion element is a post, the receiving element is a cylindrical receptacle for the post, and the damping element has an outer diameter sized to be received in the cylindrical receptacle and a hole sized to receive the post.

In another form, the at least one radial positioning means comprises a first and a second radial positioning means, the first and second radial positioning means each including the insertion element and the receiving element.

In yet another form, the insertion element of the second radial positioning means is a post, the receiving element is an oblong receptacle for the post, and the damping element has an outer length and outer width sized to be received in the oblong receptacle and an inner length and inner width, wherein the inner width is sized to generally correspond to an outer width of the post.

In still another form, the insertion element comprises a plate-formed section, the receiving element comprises a u-shaped body having first and second sidewall portions extending from a base portion and a first flexible arm portion extending from the first sidewall portion toward the base portion and the second sidewall portion, and at least a portion of the damping element is disposed between the first flexible arm portion and the first sidewall portion.

In another form, the receiving element is removably mounted to the steering wheel body.

In another form, the receiving element further comprises a second flexible arm portion extending from the second sidewall portion toward the base portion and the first sidewall portion.

In another form, the steering wheel unit further includes a second damping element disposed between the second sidewall portion and the second flexible arm portion.

In another form, the damping element comprises a first sidewall portion, a second sidewall portion, and a base portion extending therebetween, the first sidewall portion of the damping portion is disposed between the first flexible arm portion and the first sidewall portion of the receiving element, and the second sidewall portion of the damping portion is disposed between the second sidewall portion of the receiving element and the second flexible arm portion.

In another form, the steering wheel unit further includes a second damping element, wherein the mounting plate is mounted to the steering wheel body via a mechanical connection, and the second damping element is disposed between the mechanical connection and the steering wheel body.

In another form, the mechanical connection comprises a screw received within a shoulder member, and the second damping element is disposed between the shoulder member and the steering wheel unit.

In another form, the steering wheel unit includes a recess therein, and the second damping element is sized to generally correspond to the recess.

In another form, the damping element includes at least one flange portion extending outwardly therefrom, the receptacle includes at least one gap, and the at least one flange portion is received in the least one gap.

In another form, the airbag module includes the insertion element, and the mounting portion includes the receiving element.

In another form, the mounting portion includes the insertion element, and the airbag module includes the receiving element.

In another form, the radial positioning means are disposed inboard of the axial positioning means.

In another form, the radial positioning means are disposed outboard of the axial positioning means.

In another form, the steering wheel unit comprises three radial positioning means.

BRIEF DESCRIPTION OF THE DRAWINGS

FIG. 4 is a birds-eye view of an airbag module in accordance with the present invention with a schematic representation of positioning means, FIG. 5 shows a mounting plate, FIG. 13 shows area B4 of FIG. 12 in a view corresponding to FIG. 6, FIG. 14 shows area B5 in a view corresponding to FIG. 13, FIG. 14A shows a positioning means with another damping element, FIG. 14B shows the items shown in FIG. 14A with an insertion element of the positioning means in a non-assembled state.

DETAILED DESCRIPTION

Referring now to the figures, the invention will now be explained in more detail with reference to exemplary embodiments. The basic mounting arrangement, which will now be explained in more detail with reference to FIGS. 1 to 3, generally applies to each embodiment.

Figure 1:
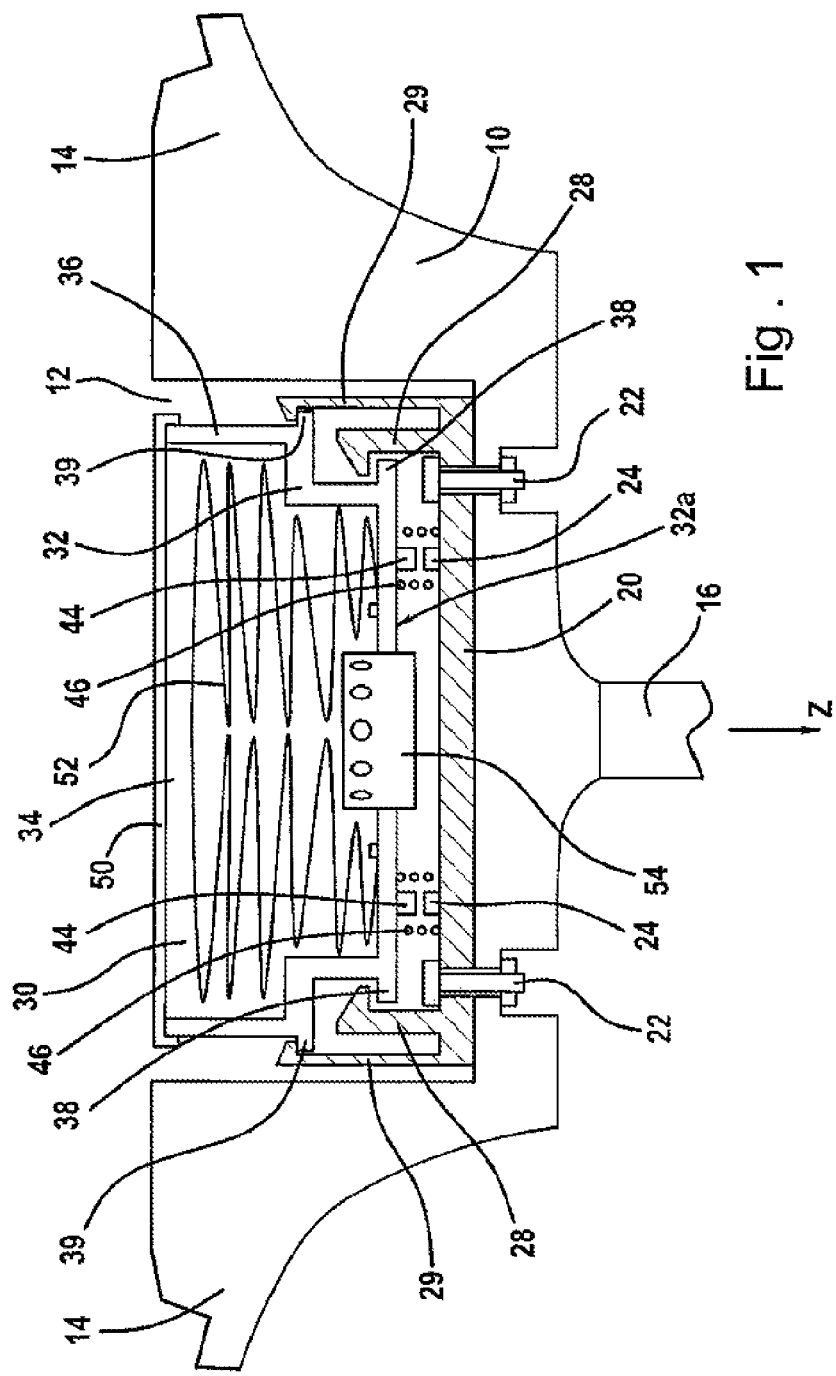
FIG. 1 is a strongly schematized cross-section through the hub area of a steering wheel, in which an airbag module is accommodated.

FIG. 1 shows a longitudinal section through the hub area of a steering wheel unit in schematic form. This steering wheel unit includes a steering wheel with a steering wheel body 10, which has a recess 12 in the hub area. Spokes 14 extend from the hub area. Steering column 16 extends from the approximate center of the hub. The direction of extension of steering column 16 defines the axial or Z direction for what is to follow. The plane which is perpendicular to this Z direction (this plane is also perpendicular to the drawing plane of FIG. 1) is the XY plane.

On the floor of recess 12, a mounting plate 20 is screwed together with steering wheel body 10 by means of screws 22, in other words is connected to it in rigid fashion. It is also possible that the mounting plate 20 is an integral part of the steering wheel body 10. According to the definitions chosen in this application, mounting plate 20 and all the components which extend from it are considered to belong to the steering wheel.

An airbag module 30 is accommodated in the recess 12. This airbag module has a housing 32, an airbag 52 accommodated in housing 32, and a gas generator 54. Housing cover 50, which also belongs to the airbag module, extends over exit opening 34 of housing 32, which is opened by the expanding airbag in a known fashion.

Housing floor 32a of housing 32 is connected with mounting plate 20 by means of spiral springs 46, so that airbag module 30, and in particular also housing 32, can be pressed down against the force of these spiral springs 46 in the axial direction against the steering wheel. If airbag module 30 is pressed down far enough, horn contacts 24 and 44 are closed (see FIG. 2).

Figure 2:
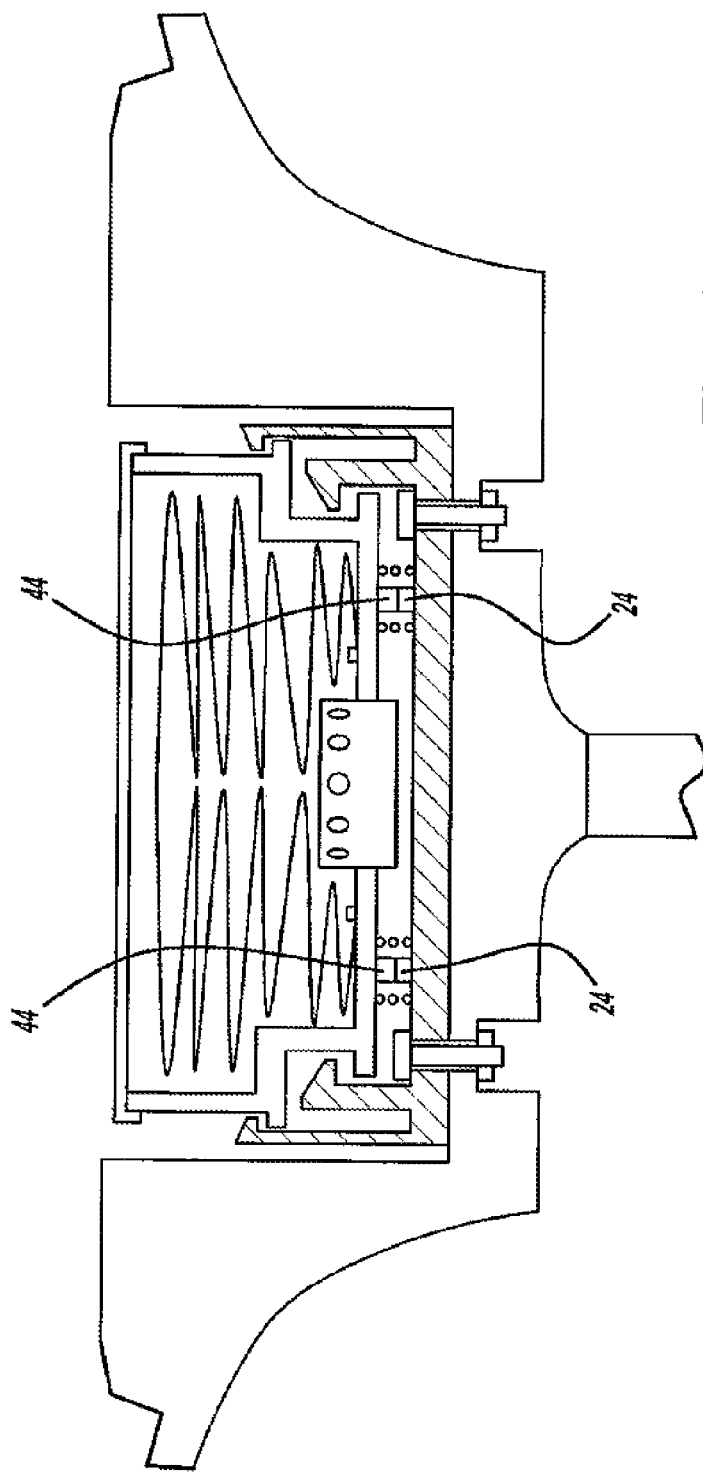
FIG. 2 shows the items shown in FIG. 1 with the airbag module pressed down.

Spiral springs 46 are generally not able to define the position of airbag module 30 precisely in relation to the steering wheel, so positioning means can be provided. In total, the airbag module has five degrees of freedom in relation to the steering wheel (three translation degrees of freedom and two rotational degrees of freedom), so that the positioning means have to be designed accordingly. If exactly one positioning means is provided for each possible direction of movement, generally six positioning means are required. However, it will be appreciated that other quantities of positioning means can be used to cover each of the five degrees of freedom. Each positioning means consists of two parts, namely a part on the steering wheel side and a part on the module side. FIG. 1 shows two positioning means, which each serve axial positioning, in other words positioning in the Z direction. Each of these axial positioning means exhibits an axial positioning hook 29 as an axial positioning means on the steering wheel side, and an axial positioning step 39 as axial positioning means on the module side. The sectional drawings only show two axial positioning means, but in practice three of these are usually present. Spiral springs 46 press housing 32 upwards and therefore press axial positioning steps 39 extending from the housing from below against axial positioning hooks 29, so that the axial position (Z position) of the module 30 is defined. For operation of the horn, airbag module 30 can be pressed down in the axial direction as shown in FIG. 2, or it can be pressed down in a tilted fashion. The axial positioning means can be manufactured of plastic and in particular the axial positioning means on the module side can be manufactured in one piece with the housing 32.

Figure 3:
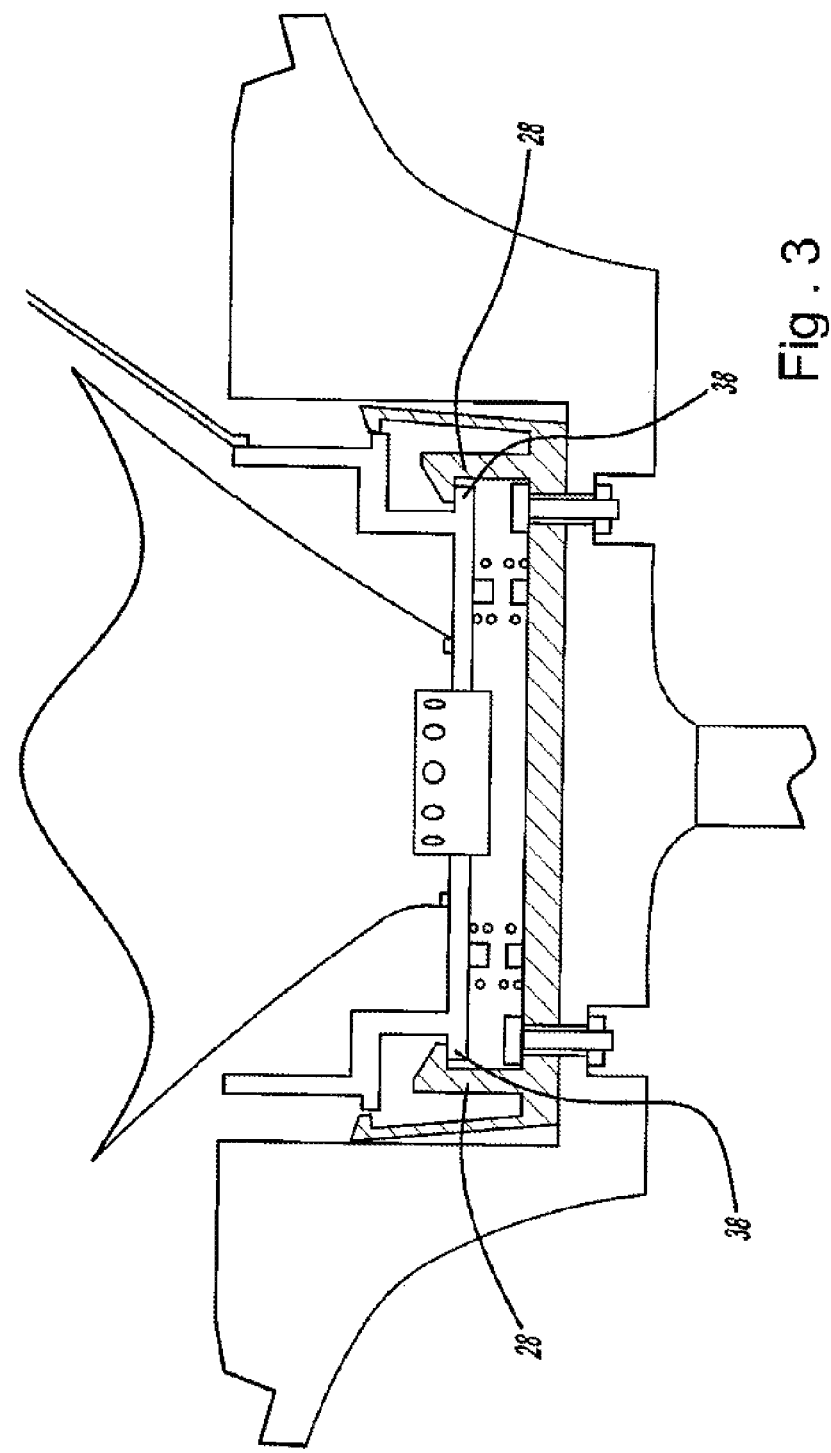
FIG. 3 shows the items shown in FIG. 1 during expansion of the airbag.

In one form, supplemental retaining means can be provided for when the airbag fires, as shown in FIG. 3. The supplemental retaining means comprise retaining means on the steering wheel side, here namely retaining hooks 28, and retaining means on the module side, here namely retaining steps 38. The supplemental retaining means do not generally provide axial or radial positioning, and can therefore be one of the various optional modifications to the invention. While the various figures illustrate these retaining means, it will be appreciated that the shown configurations could be free from this structure.

Additional detail regarding exemplary types and variations of mounting configurations and detail regarding the optional supplementary retaining means and axial positioning means is disclosed in U.S. Pat. No. 8,087,691, filed Feb. 3, 2009 and issued Jan. 3, 2012, which is hereby incorporated by reference in its entirety.

Having described the general structure of the airbag module 30 and its axial or Z positioning with the steering wheel body 10, the various forms of radial or XY positioning means will now be described.

In one form, FIG. 4 shows a birds-eye view of the airbag in a schematic form and the position and function of the individual positioning means, also in schematic form. In total, five positioning means are present, namely three pure axial positioning means that were described above, (designated with Z1 to Z3), an XY positioning means (designated with X1Y1), and also a further X positioning means (designated with X2). The X positioning means and the XY positioning means generally do not function in the axial direction; they are therefore designated as non-axial or radial positioning means.

Figure 8:
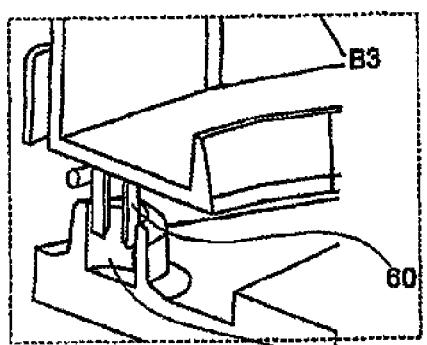
FIG. 8 shows area B3 from FIG. 4 in a view corresponding to FIG. 6.

The positioning means X1Y1 and X2 serve to define the position of airbag module 30 in the XY plane and to prevent rotation in this plane, thereby providing radial positioning in addition to the axial positioning previously described. The X1Y1 positioning means are in the form of corresponding insertion elements and receiving elements, and contain a first positioning peg 60 as positioning means on the module side, and a circular first positioning receptacle 64 as positioning means on the steering wheel side (FIG. 8). The X2 positioning means contains a second positioning peg 62 as positioning means on the module side as well as an oblong-shaped second positioning receptacle 66 as positioning means on the steering wheel side. The oblong shape of the second positioning receptacle 66 serves to compensate for differences in length caused by shrinkage or change in temperature.

Thus, the airbag module 30 includes pegs 60 and 62 extending therefrom, which are received in the receptacles 64 and 66, respectively, which extend from the mounting plate 20. Moreover, additional pegs and receptacles could be used to provide further radial positioning. For example, rather than using two peg/receptacle connections, three or more peg/receptacle connections could be used.

Additionally, rather than have the pegs 60 and 62 extend from the airbag module 30, the pegs 60 and 62 could extend from the mounting plate 20, with receptacles 64 and 66 extending from the airbag module. Or, in a further alternative, one peg could extend from the airbag module 30, while another peg extends from the mounting plate 20, where each peg has a corresponding receptacle at the airbag module 30 or mounting plate 20, as necessary. It will be appreciated that numerous permutations of peg/receptacle connections relating to both quantity and orientation could be used.

As described, the pegs 60 and 62 have a generally cylindrical shape. The receptacle 64 has a generally cylindrical shape, and the receptacle 66 has a generally oblong shape. The receptacles 64 and 66 can include wall portions 64a and 66a, respectively, and gap portions 64b and 66b, respectively.

FIG. 5 shows mounting plate 20 of the first embodiment. Here, the three axial positioning hooks 29 can be seen, which serve as axial positioning means on the steering wheel side, two retaining hooks 28, which serve as supplemental retaining means on the steering wheel side, as well as the two positioning receptacles 64 and 66. The axial positioning hooks and the retaining hooks are each formed rigidly. As described above, retaining hooks 28 provide supplemental support when the airbag fires, but are not generally used to provide axial positioning under normal operating conditions of the vehicle when the airbag is not firing.

Figure 6:
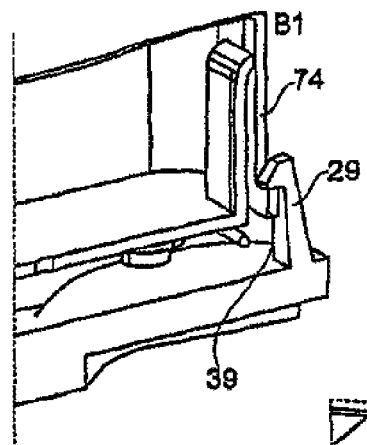
FIG. 6 shows area B1 from FIG. 4 in a detailed 3-dimensional view, when the housing is held on the mounting plate.
Figure 7:
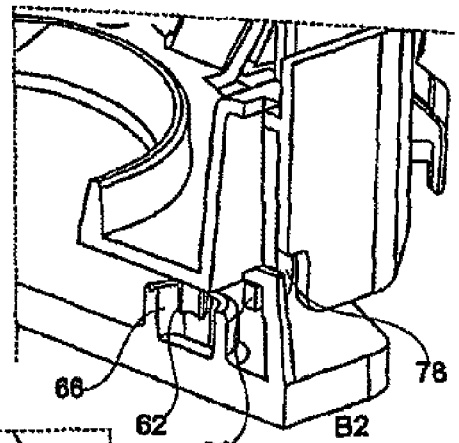
FIG. 7 shows area B2 from FIG. 4 in a view corresponding to FIG. 6.

FIGS. 6-8 show how the positioning means on the steering wheel side work together with the positioning means on the module side. The axial positioning means on the module side are in the form of axial positioning steps 39, which are the underside of U-hoops 74 and 78. Because of the mirror symmetry of airbag module 30 and mounting plate 20 (the mirror-image plane lies in the XZ plane), the two hoops which belong to the Z1 or Z2 axial positioning means are designated as first U-hoops 74, and the U-hoops belonging to axial positioning means Z3 are designated as second U-hoop 78.

As described, this embodiment includes the airbag module 30 being received on a mounting plate 20, which is itself a part of the steering wheel body 10. The vibration in the steering wheel column 16 (FIG. 1) from various parts of the vehicle will therefore be passed through the steering wheel body 10 to the airbag module 30. A means for reducing the vibration felt by the operator can be added to the various positioning means between the airbag 30 and the steering wheel body 10. The reduction in vibration can also limit the "bump-squeak-rattle" effect.

Figure 9:
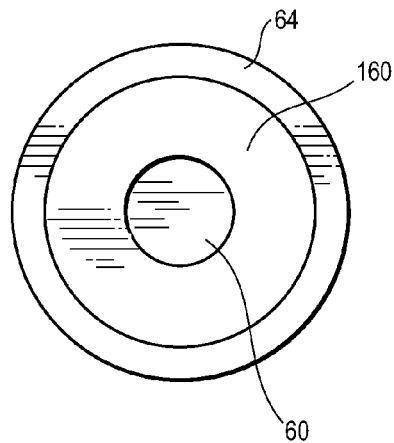
FIG. 9 is a plan view showing a radial positioning means with a damping element.
Figure 9A:
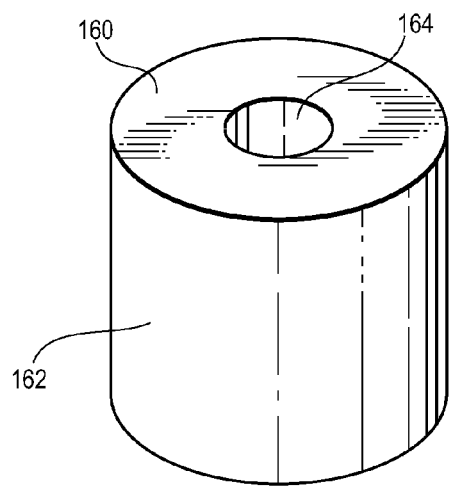
FIG. 9A is an isometric view of the damping element of FIG. 9.

With reference to FIGS. 9 and 9A, a damping element 160 can be disposed between the peg 60 and receptacle 64 for reducing the vibrations in the airbag module 30 and the steering wheel. The damping element 160 can be made from a suitable elastomeric material. The particular material properties of the elastomeric material can vary depending on the desired damping requirements or frequencies experienced in the particular vehicle. Similarly, the shape or thickness of the damping element 160 can vary to similarly account for the particular vehicle conditions. It will be appreciated that the selection of material and/or thickness of the damping element 160 is within the ability of a person having ordinary skill in the art. Selection of such material or thickness may include some amount of trial and error, but such investigation or experimentation should not rise to the level of undue experimentation. The myriad vehicle types and ride profiles thereof can require a wide variety of desired damping abilities.

The damping element 160 can have a generally cylindrical sidewall 162 corresponding to the cylindrical shape of the receptacle 64. The damping element 160 further includes a hole 164 extending therethrough and corresponding to the shape of the peg 60. The damping element 160 is preferably sized to have a generally snug fit between the peg 60 and receptacle 64. The flexible nature of the elastomeric material can allow for the hole 164 to be slightly smaller than the diameter of the peg 60. Similarly, the outer diameter of the damping element 160 can be slightly larger than the inner diameter of the receptacle 64 to provide for the snug fit. The damping element 160 can thereby be press-fit into the receptacle 64 or, alternatively, press fit onto the peg 60. Of course, other suitable attachment types could also be used.

Figure 10:
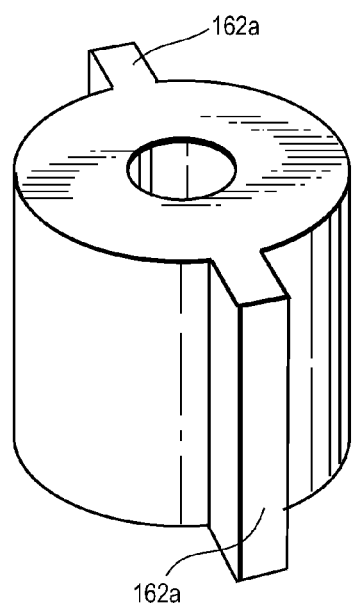
FIG. 10 is an isometric view of an alternative damping element.
Figure 10A:
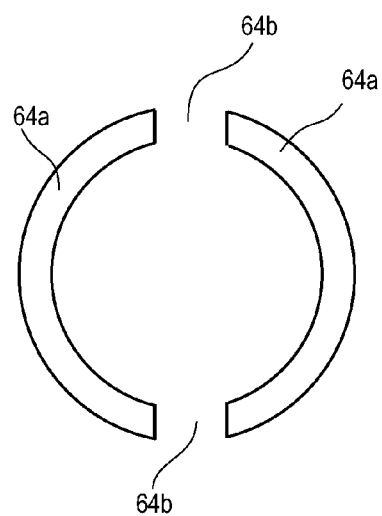
FIG. 10A is a plan view of a receptacle for receiving the alternative damping element of FIG. 10.

With reference to FIGS. 10 and 10A, in another form, the damping element 160 can include one or more flange portions 162a extending outwardly from the sidewall 162. In such a form, the corresponding receptacle gaps 64b are configured to receive the flange portion 162a. The flange portions 162a and gaps 64b can be oriented to help ensure a particular installation orientation of the airbag module 30, if desired. It will be appreciated that various quantities of flanges 162a can be used, with the corresponding receptacle 64 including at least as many gaps 64a to receive the flanges 162a.

Figure 11:
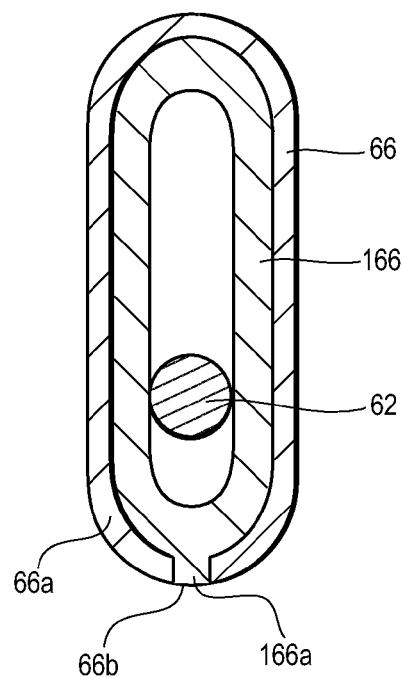
FIG. 11 is a plan view of another radial positioning means with another damping element.

Similarly, and with reference to FIG. 11, a damping element 166 could be used between the peg 62 and receptacle 66. The damping element 166 can be of similar construction as the damping element 160, except that the damping element 166 has an oblong shape to correspond to the oblong shape of the receptacle 66. Similar to the above, the damping element 166 can include flanges 166a for being received in the gaps 66b, previously described.

These damping elements 160 and 166 primarily provide damping abilities in the radial direction. Steering wheel vibration is generally experienced laterally and radially, so the damping elements 160 and 166 can operate to reduce the amount of vibration felt by the operator of the steering wheel.

The installation of the damping elements 160 and 166 at the interface between the steering wheel and the airbag allows for a robust and easily modifiable solution to providing steering wheel vibration damping. Adjusting the desired vibration characteristics is as simple as exchanging the particular damping element with another having different damping capabilities. There is, therefore, a reduced need to provide specific damping solutions to other areas of the steering wheel and steering wheel column, or other areas of the vehicle, thereby reducing installation time and cost.

Figure 12:
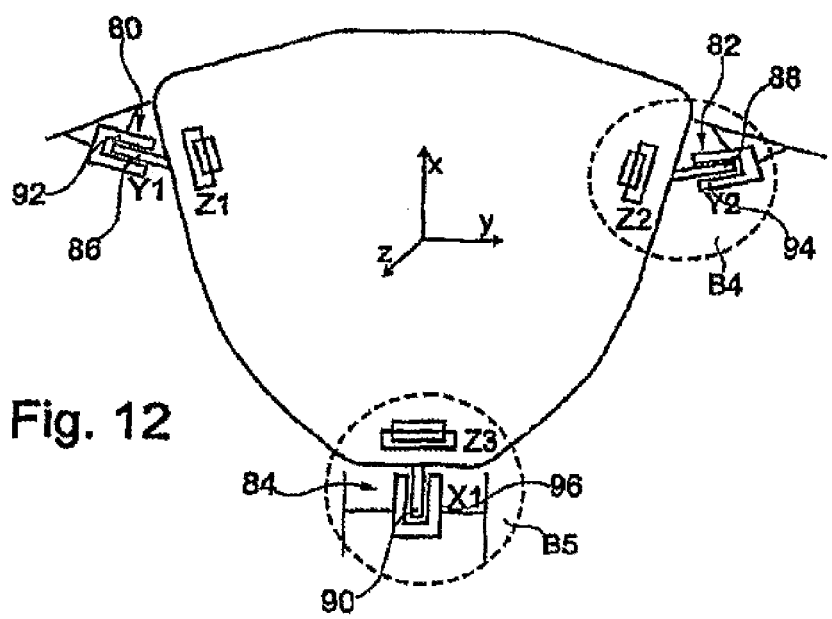
FIG. 12 is a birds-eye view of the airbag module according to a second embodiment of the invention in a view corresponding to FIG. 4 with a schematic representation of the positioning means.

FIGS. 12 to 14 show a second embodiment of the invention. The axial positioning means are similarly formed as those in the first embodiment and they are therefore not described again here. In contrast to the first embodiment, positioning in the XY plane is achieved by means of outer positioning means 80, 82, and 84, which each include insertion elements and receiving elements. On the module side, these comprise plate-formed sections 86, 88, and 90 and on the steering wheel side suitable receiving elements 92, 94, and 96. Such a plate-shaped section 86 and a receiving element 92 in a mounted state are shown in FIG. 14A as a section. The receiving element has a basically U-shaped cross-section, whereby from an upper end of a first leg 92a an elastic arm 92c extends into the inside of the U. The inner side of second leg 92b lying opposite first leg 92a is convex in form. The minimum distance between the elastic arm and the second leg is, when in force-free condition, smaller than the thickness of the plate-shaped section, so that in mounted condition the plate-shaped section is pressed on the second leg, which leads to positional fixing in the XY plane (FIG. 14B). It will be appreciated that the shape of leg 92b could also be generally straight and without the convex form.

The receiving elements 92, 94, and 96 are preferably separate elements of plastic, which are located into recesses provided for this purpose in the steel wheel body by means of a form fit. An off-centered peg 100 is provided on the bottom leg of the U-shaped receiving element, along with side projections 102, so that the receiving element can only be inserted into the respective recess in its correct orientation.

Figure 15:
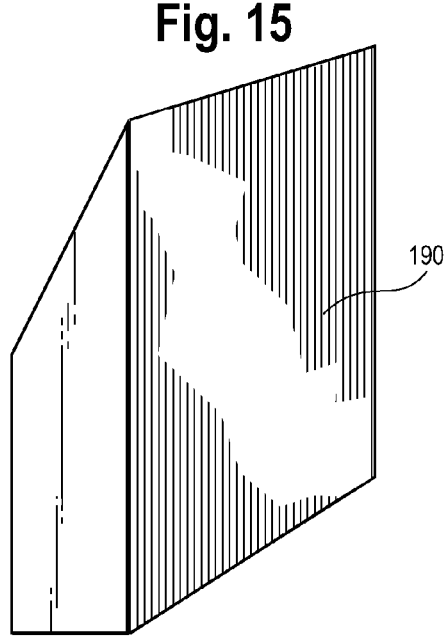
FIG. 15 is an isometric view of the damping element of FIG. 14A.
Figure 16:
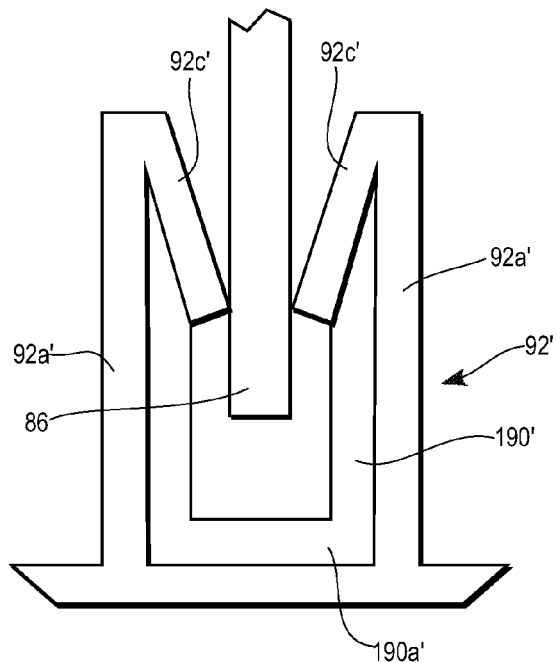
FIG. 16 shows an alternative positioning means.

With reference to FIGS. 14-16, similar to the first embodiment, a damping element 190 can be disposed at the outer positioning means 80, 82, and 84. In one form, the damping element 190 can be disposed between first leg 92a and elastic arm 92c. The damping element 190 can have a generally wedged shape for fitting between the first leg 92a and elastic arm 92c. When the plate shaped section 86 is received in the receiving element 92, the damping element 190 will provide a snug fit between the two, and the flexible nature of the elastomeric material of the damping element 190 wall cause the airbag module 30 mounted to the steering wheel 10 to dampen the vibrations therein.

The receiving element 92 is modularly received in the steel wheel body, as described above, with off-centered peg 100 ensuring correct orientation of insertion. Because of the modular nodular nature of the receiving element 92, the damping element 190 can be easily replaced by simply removing the receiving element 92 and exchanging the damping element 190 with one having differing damping characteristics. This provides for a robust and easily modifiable damping solution for the steering wheel.

Figure 17:
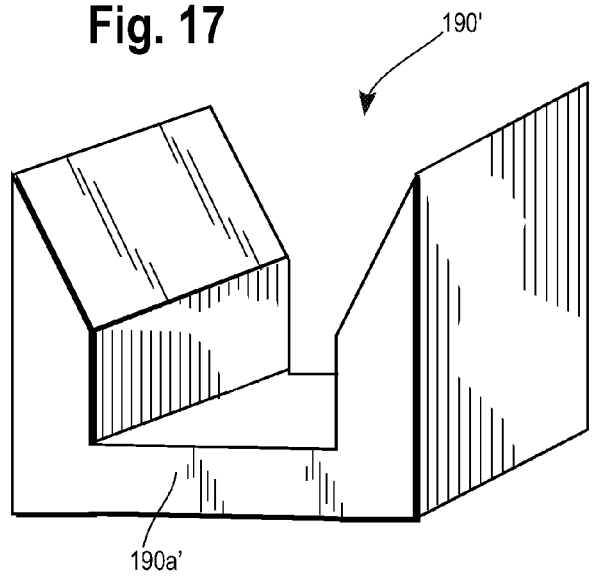
FIG. 17 is an isometric view of the damping element of FIG. 15.

Turning now to FIGS. 16 and 17, in an alternative embodiment similar to the above, a receiving element 92' includes a pair of first legs 92a' and elastic arms 92c' on opposing sides. A damping element 190' can be inserting therebetween at each side of the receiving element 92'. Similar to the above, when the plate shaped section 86 is inserted into the receiving element 92', the damping element 190' creates a snug fit and provides vibration damping of the steering wheel. In one form, the damping element 190' can include a connecting portion 190a' so as to form a u-shaped damping element 190'. It will be appreciated that a pair of damping elements 190 could be used in place of the damping element 190'.

The above description related to the damping element 190 for outer positioning means 80, and its corresponding plate shaped section 86 and receiving element 92, applies similarly to outer positioning means 82 and 84, and their corresponding components. Furthermore, the above description regarding the alternative damping element 190' can similarly apply. It will be appreciated that various permutations of the above described variants can be combined to achieve the desired results.

While the above outer positioning means 80, 82, and 84 are described as being "outer," it will be appreciated that a structure similar to positioning means 80, 82, and 84 could be positioned further inwardly between the mounting plate 20 and the airbag module 30, similar to the inboard location of the peg 60 and receptacle 64 interface. Moreover, it will be appreciated that different quantities of similar outer positioning means could be used, if desired.

Figure 18:
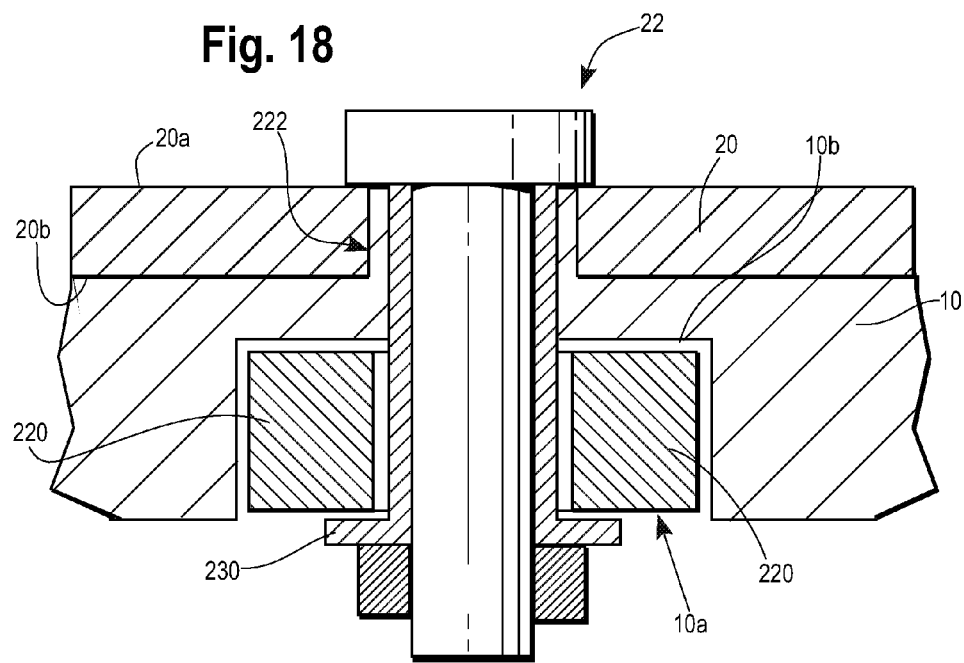
FIG. 18 shows a mechanical connection between a steering wheel body and a mounting plate with a damping element.
Figure 19:
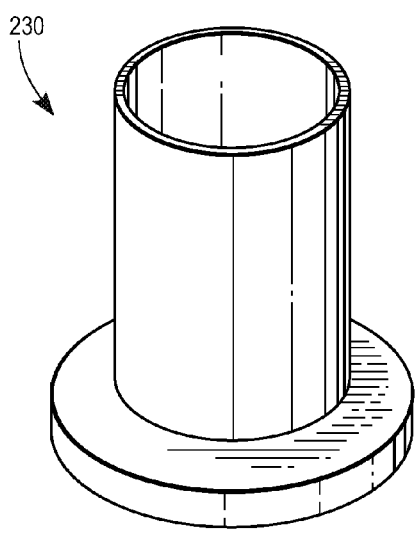
FIG. 19 is an isometric view of a shoulder member of the mechanical connection of FIG. 18.
Figure 20:
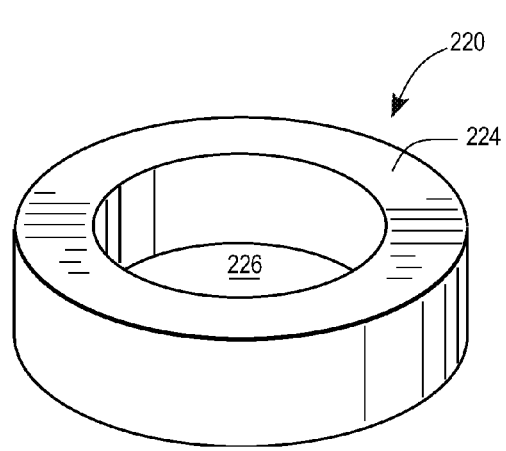
FIG. 20 is an isometric view of the damping element of FIG. 18.

Turning now to FIGS. 18-20, in another embodiment, alternatively or in addition to the damping solutions described above, the connection between the mounting plate 20 and the steering wheel body 10 can include a damping element 220. With reference back to FIG. 1, screw 22 is shown mounting the mounting plate 20 to the steering wheel body 10. More specifically, and with reference to FIG. 18, the mounting plate 20 includes an upper surface 20a and lower surface 20b. The steering wheel body further includes a bottom recess 10a having a generally cylindrical shape therein, with the bottom recess 10a including a mounting surface 10b. The mounting plate 20 further includes a hole 222 extending therethrough. At the location of the connection, the hole 222 and recess 10a are generally coaxial.

The damping element 220 has a generally cylindrical body 224 with a hole 226 extending therethrough. The damping element 220 is configured to be received within the recess 10a so that the holes 222 and 226 are aligned.

The connection can further include a shoulder member 230 extending through the holes 222 and 226. The screw 22 can be inserted through the shoulder 230 for mounting the mounting plate 20 to the steering wheel body 10. The damping element 220 thus surrounds the screw 22 and shoulder 230 providing vibration damping for the steering wheel.

While the damping element 220 has been described as having a generally cylindrical shape, it will be appreciated that the damping element 220, and the recess 10a, could have differing shapes and provide the necessary damping characteristics.

While the above description constitutes the preferred embodiments of the present invention, it will be appreciated that the invention is susceptible to modification, variation, and change without departing from the proper scope and fair meaning of the accompanying claims.

We claim:

1. A steering wheel unit for a motor vehicle with a steering wheel, the steering wheel unit comprising:
    a steering wheel body having a hub area;
    an airbag module mounted to the hub area, the airbag module having a housing, an airbag folded into the housing, and a gas generator, wherein the airbag module can be pushed down against the force of at least one spring element to activate a horn;
    axial positioning means for retaining the airbag module at least axially relative to the steering wheel body;
    at least one radial positioning means for retaining a radial positioning of the airbag module relative to the steering wheel body, the radial positioning means comprising an insertion element and a receiving element, one of the insertion element or the receiving element being connected to one of the airbag module or the steering wheel body, and the other of the insertion element or the receiving element being mounted to the other of the airbag module or the steering wheel body;
    a vibration damping element made of elastomeric material mounted between at least a portion of the insertion element and at least a portion of the receiving element for limiting a radial vibration, the vibration damping element being sized to fill a radial gap between the insertion element and the receiving element; wherein a bottom of the vibration damping element is arranged such that the bottom of the vibration element is located above a bottom of the receiving element.

2. The steering wheel unit of claim 1, wherein the receiving element and the insertion element are axially movable relative to each other.

3. The steering wheel unit of claim 1, wherein the steering wheel body includes a mounting plate having the hub area, the airbag module is mounted to the mounting plate, and the mounting plate is fixedly mounted to the steering wheel body.

4. The steering wheel unit of claim 3 further comprising a second damping element, wherein the mounting plate is mounted to the steering wheel body via a mechanical connection, and the second damping element is disposed between the mechanical connection and the steering wheel body.

5. The steering wheel unit of claim 4, wherein the mechanical connection comprises a screw received within a shoulder member, and the second damping element is disposed between the shoulder member and the steering wheel unit.

6. The steering wheel unit of claim 4 wherein the steering wheel unit includes a recess therein, and the second damping element is sized to generally correspond to the recess.

7. The steering wheel unit of claim 3, wherein the airbag module includes the insertion element, and the mounting plate includes the receiving element.

8. The steering wheel unit of claim 3, wherein the mounting portion includes the insertion element, and the airbag module includes the receiving element.

9. The steering wheel unit of claim 1, wherein the insertion element is a post, the receiving element is a cylindrical receptacle for the post, and the damping element has an outer diameter sized to be received in the cylindrical receptacle and a hole sized to receive the post.

10. The steering wheel unit of claim 9, wherein the damping element includes at least one flange portion extending outwardly therefrom, the receptacle includes at least one gap, and the at least one flange portion is received in the least one gap.

11. The steering wheel unit of claim 1, wherein the at least one radial positioning means comprises a first and a second radial positioning means, the first and second radial positioning means each including the insertion element and the receiving element.

12. The steering wheel unit of claim 11, wherein the insertion element of the second radial positioning means is a post, the receiving element is an oblong receptacle for the post, and the damping element has an outer length and outer width sized to be received in the oblong receptacle and an inner length and inner width, wherein the inner width is sized to generally correspond to an outer width of the post.

13. The steering wheel unit of claim 1, wherein the insertion element comprises a plate-formed section, the receiving element comprises a u-shaped body having first and second sidewall portions extending from a base portion and a first flexible arm portion extending from the first sidewall portion toward the base portion and the second sidewall portion, and at least a portion of the damping element is disposed between the first flexible arm portion and the first sidewall portion.

14. The steering wheel unit of claim 13, wherein the receiving element is removably mounted to the steering wheel body.

15. The steering wheel unit of claim 13, wherein the receiving element further comprises a second flexible arm portion extending from the second sidewall portion toward the base portion and the first sidewall portion.

16. The steering wheel unit of claim 15 further comprising a second damping element disposed between the second sidewall portion and the second flexible arm portion.

17. The steering wheel unit of claim 15 wherein the damping element comprises a first sidewall portion, a second sidewall portion, and a base portion extending therebetween, the first sidewall portion of the damping portion is disposed between the first flexible arm portion and the first sidewall portion of the receiving element, and the second sidewall portion of the damping portion is disposed between the second sidewall portion of the receiving element and the second flexible arm portion.

18. The steering wheel unit of claim 1, wherein the at least one radial positioning means is disposed inboard of the axial positioning means.

19. The steering wheel unit of claim 1, wherein the radial positioning means are disposed outboard of the axial positioning means.

20. The steering wheel unit of claim 1, wherein the steering wheel unit comprises three radial positioning means.

* * * * *